United States Patent [19]

Huang et al.

[11] Patent Number: 5,617,145
[45] Date of Patent: Apr. 1, 1997

[54] ADAPTIVE BIT ALLOCATION FOR VIDEO AND AUDIO CODING

[75] Inventors: Si J. Huang; Ah P. Tan, both of Singapore, Singapore

[73] Assignee: Matsushita Electric Industrial Co., Ltd., Osaka, Japan

[21] Appl. No.: 361,438

[22] Filed: Dec. 22, 1994

[30] Foreign Application Priority Data

Dec. 28, 1993 [JP] Japan .................................. 5-336975

[51] Int. Cl.$^6$ ..................................................... H04N 7/24
[52] U.S. Cl. ............................................. 348/423; 395/2.38
[58] Field of Search .................................... 348/423, 390, 348/384; 395/2.28, 2.29, 2.38, 2.39, 154; 381/34, 35

[56] References Cited

U.S. PATENT DOCUMENTS

| | | | |
|---|---|---|---|
| 5,231,492 | 7/1993 | Dangi et al. | 348/15 |
| 5,309,290 | 5/1994 | Sugiyama et al. | 360/32 |
| 5,317,672 | 5/1994 | Crossman et al. | 348/15 |
| 5,367,629 | 11/1994 | Chu et al. | 348/400 |
| 5,452,006 | 9/1995 | Auld | 348/390 |
| 5,467,139 | 11/1995 | Lankford | 348/423 |
| 5,471,558 | 11/1995 | Tsutsui | 395/2.28 |

FOREIGN PATENT DOCUMENTS

| | | |
|---|---|---|
| 0501699 | 2/1992 | European Pat. Off. . |
| 0515101 | 11/1992 | European Pat. Off. . |
| 0540961 | 5/1993 | European Pat. Off. . |
| 4-360481 | 12/1992 | Japan . |

OTHER PUBLICATIONS

*Signal Processing: Image Communication*, vol. 4, No. 2, Apr. 1992, Amsterdam NL, pp. 153–159, "The MPEG Systems Coding Specification," by Alexander G. MacInnis, p. 154, left column, paragraph 2, right column, paragraph 3, figure 1.

Primary Examiner—Tommy P. Chin
Assistant Examiner—Bryan S. Tung
Attorney, Agent, or Firm—Beveridge, DeGrandi, Weilacher & Young, L.L.P.

[57] ABSTRACT

A very low bit rate video and audio coding system that performs allocation for distributing the bit rate based on the needs for the video and audio signals is disclosed. The audio time bands are set to frames as determined by the video signal. The audio is encoded first to determine the number of bits that will be saved based on the energy distribution of the audio signal. Audio signal information is stored in a FIFO buffer to await the arrival of the accompanying video signal. The video signal is then coded as an I picture, a P picture or an extra P picture based on the number of bits available in the buffer, the number of bits saved by the audio encoding, and the minimum number of bits required for video coding. After encoding, the video signal is sent to the FIFO buffer to be matched with the audio signal and outputted as one bit stream by a multiplexer.

5 Claims, 9 Drawing Sheets

ADAPTIVE BIT ALLOCATION FOR VIDEO AND AUDIO CODING

BACKGROUND OF THE INVENTION

1. Industrial Field of Utilization

The present invention relates to very low bit rate video and associated audio coding, specifically to the dynamic allocation of video bit rate according to the instant bit rate consumption of audio signal in a constant bit rate system.

2. Background and Prior Art

Digital video and associated audio coding plays a key role in the industrial applications of digital signal storage, processing, transmission and distribution. Various digital coding standards have been and are being developed by various standardization bodies. For the moving picture and associated audio coding, typical coding scheme involve three parts, namely, video coding, audio coding and system multiplexing.

The current transform coding algorithms adopted by the MPEG phase one and phase two standards involve such techniques as transformation, quantization and variable length coding. To increase the coding efficiency, predictive coding techniques such as inter picture prediction, motion estimation and compensation are used. Therefore, a picture could be encoded by reducing its spatial redundancy within the picture itself. A picture coded in this way is usually referred to as an I picture. A picture could also be encoded in inter picture mode. If a picture is predicted only from the previous picture, it is referred to as a P picture. If a picture is predicted both from the previous picture and future picture, the picture is referred to as a bi-directional predictive coded picture, which is usually called a B picture. A main feature of the current video coding scheme is that the bit rate of the coded bitstream is a fixed constant by using a FIFO buffer. The fullness of the buffer is used to adjust the quantization step and bits available for the I, B and P picture so as to control the bit rate of each coded picture.

Many audio coding algorithms have emerged with the introduction of digital communication links, mobile communication, entertainment and multimedia services. In particular, various very low bit rate speech coding algorithms have been standardized to reduce transmission bit rate or the memory capacity of the voice storage systems. Toll quality speech could be obtained from the recently standardized CCITT G.728 16 kbits/s coder. Communications quality could be obtained using the USA Federal Standard 1016 4.8 kbits/s voice coder. The Vector Sum Excited Linear Predictive Coder standardized for North American and Japan cellular communications could provide near toll quality at 8.0 kbits/s operation. These algorithms generally fall into the class of speech coders known as Code Excited or Vector Excited Linear Prediction coders and have been typically designed for constant bit rate transmissions. The number of bits per audio frame is also kept constant.

Very limited variable bit rate for speech coding has been considered for packet switching networks, digital speech interpolation systems and digital communication multiplication equipment systems.

The main function of the system encoder is to provide the necessary and sufficient information to synchronize the decoding and presentation of video and audio information, and at the same time ensuring that coded data in the decoders' buffer does not overflow or underflow. Coding the system layer information includes packetizing the data into packets and creating time-stamps for the packet header. Two time stamps are used: presentation time stamp (PTS) which indicates when the presentation unit of an audio frame or video picture should be play or broadcast, and decoding time stamp (DTS) which indicates the time to decode an audio or video picture. The PTS and DTS have a common time base, called system clock reference (SCR), to unify the measurement of the timing, ensure correct synchronization and buffer management. In a fixed constant bit rate environment, the system expects a fixed bit rate audio and video for the correct buffer management.

The coding scheme described above has following problems that prevent us from achieving a very high compression ratio and coding efficiency, which are the key factors for various very low bit rate video and associated audio coding applications.

The inefficiency of current coding scheme arises from:

1) Constant audio bit rate

The current audio coding scheme encodes an audio signal at a constant bit rate. If we define the audio information as a complexity measure which reflects the signal intensity and frequency distribution, we find the complexity varies with time. For example, considering the videophone application, when one party to the communication is talking, the other party is usually listening and silent. This mean that there are moments when the listener does not make any voice input. Secondly, there are silent moments existing even when a person is talking. A constant audio encoder wastes the bandwidth during those silent moments. For very low bit rate coding applications, it is possible that the audio occupies similar or even higher bandwidth than the video. The problem to be solved here is to use a variable bit rate audio encoder for audio coding and save the bits for video coding use.

2) Constant video bit rate

The current video coding scheme provides a constant bitstream output by using a FIFO buffer at the end of the encoder. The instant bit usage and buffer fullness are used to adjust the bits for each picture and the quantization step. The latter is used to control the bit rate of the next encoded macroblock within the picture. This bit rate control process is done within the video encoder itself, which is independent of the bit usage of the audio encoder. How to make use of the bit saving from the audio encoder to improve the video coding quality is the problem to be solved.

3) Video dynamic bit rate control

The current video coding scheme implements bit rate control by allocating a certain number of bits to each picture and also adjusting the quantization step for each macroblock of a picture. There are cases when there are sufficient bits available that are more than enough to adjust the quantization step to its minimal value. Under such situation, the extra bits could not be efficiently used. Another problem is whether the minimal quantization step is the best way to encode a picture in the predetermined encoding mode, i.e., I picture, P picture and B picture. Especially when the current picture is set to be encoded in B picture, will the smaller quantization step give better coded picture quality than a P picture or even an I picture if the amount of bits available allows us to do either a P picture or an i picture coding? The above discussion could be concluded as a problem of how to dynamically select I, P and B picture coding modes.

A second problem under this item relates to very low bit rate coding where the picture rate of the coding scheme is usually less than the rate required by real time video. For the videophone application, as an example, the picture rate is usually set around 10 pictures per second. Because of this reduced picture rate, the jig effects, would appear if the objects in the picture move too fast. This problem also makes the predictive coding difficult when a scene is changed. How to efficiently make use of the available bits to insert a picture to the pre-determined picture rate is another issue to be addressed to improve the picture coding quality.

4) System multiplexer

Current system multiplexer accepts only the constant bit rate audio and video bitstreams to multiplex them into a constant bit rate system bitstream. There is no mechanism to control the audio and video encoder for the dynamic bandwidth allocation between the two encoders.

SUMMARY OF THE INVENTION

In consideration of the problems mentioned above, it would be advantageous to provide a communication link between the audio and video encoder such that the bit saving obtained in audio coding could be efficiently used by the video encoder to improve picture quality. It is also important to provide a more flexible video bit rate control mechanism for variable I, B, P picture coding modes and dynamic picture insertion.

A dynamic bit rate control video and associated audio coding system has been invented. The coding system at first codes a few frames of audio. This number of audio frames is decided by the picture rate of video and audio frame size. It then counts the bit spending and calculates the bit saving from the audio encoder during the previous picture coding time period. By monitoring the input audio level and analyzing of its frequency and energy contents, maximum bits may be saved during a silence period. For a non-silence period, the number of bits to be used for coding of each audio frame is selected such as to attain a predetermined frequency-weighted Signal-to-Noise measure or other perceptual measures which assures the desired audio quality level.

The saved bits from the audio encoder are sent to a bit rate allocator, which makes use of these bits together with the bit consumption of the coded previous picture and the fullness of a first-in-first-out (FIFO) buffer to calculate the available bits for the current picture coding.

The available bit amount for the current picture is sent to a coding mode selector in the video encoder. This coding mode selector decides the I, B and P picture coding for the current picture. It also decides whether an extra picture is to be inserted when the picture rate is lower than the normal picture rate required by real time video application. The available bits are also used to control the quantization step in a similar way to the current coding scheme when the picture coding mode is selected.

The system multiplexer will make up for the video delay with respect to the audio coding by inserting in the system packet the correct time stamp for the respective video and audio data. The synchronized audio and video bitstream will then be multiplexed to form a constant bit rate system bitstream.

Figure 1:
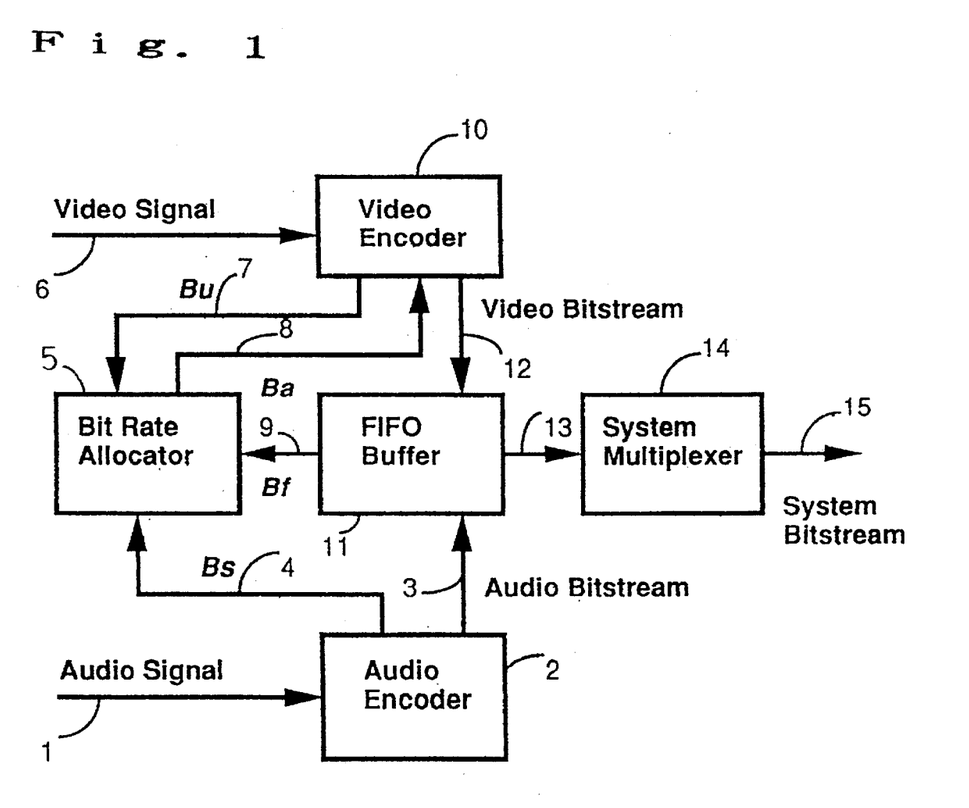
FIG. 1 shows the block diagram of the dynamic bit rate controlled video and associated audio coding system.

The operation of the coding system with dynamic bit rate control of combined audio and video coding are illustrated in FIG. 1. The coding system involves an audio encoder 2, a video encoder 10, a first-in-first-out (FIFO) buffer 11, a bit rate allocator 5 and a system multiplexer 14. This invention covers not only such a system configuration and operation, but also covers new means needed by the audio encoder 2, video encoder 10, bit rate allocator 5 and the system multiplexer 14 to support the operation of the overall coding system.

Figure 4:
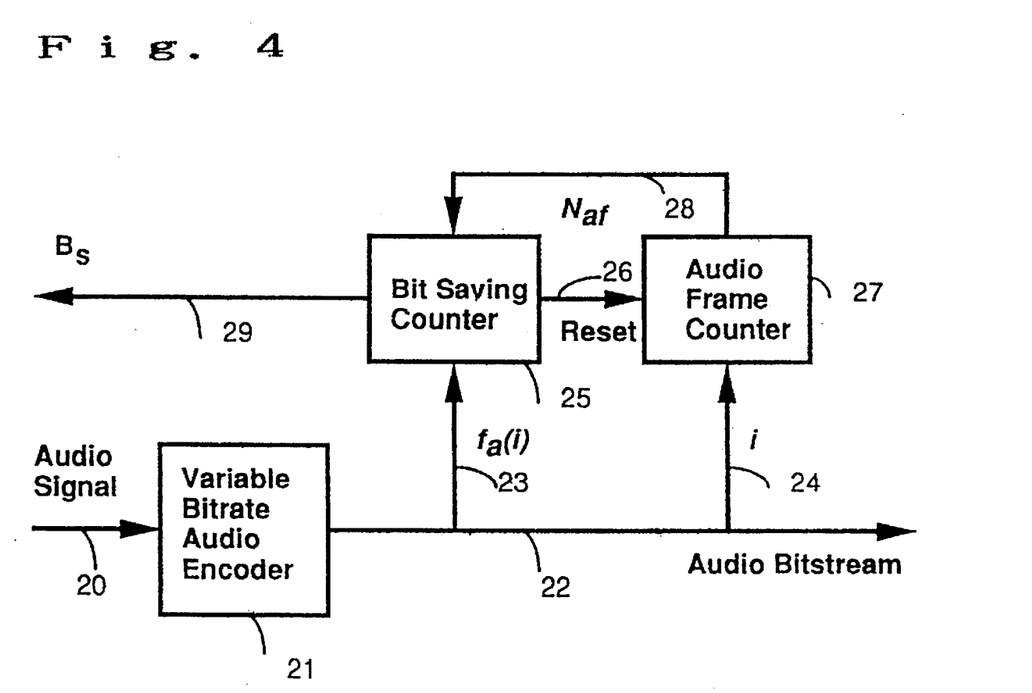
FIG. 4 shows the relationship between the bit saving counter and the variable bit rate audio encoder.

In FIG. 1, the audio bitstream 3 is encoded by a variable bit rate audio encoder 2, which includes an audio detection and identification (ADI) module 103 (FIG. 5) that performs several tasks, namely, a) to detect the silence moments in the audio signal and makes decisions for skipped audio frames b) to classify non-silence audio segments into predominantly voiced or unvoiced segments c) to allocate bits based on the frequency-weighted energy levels of the analyzed speech segments d) to transfer bit spending information to a bit saving counter (BSC) 25 (FIG. 4).

The BSC 25 calculates the bit saving after each audio frame is coded. Once the BSC 25 receives a request signal from the bit rate allocator (BRA) 5, it calculates the bits saved by the audio frames during the previous picture encoding period. This bit saving amount 4, which is denoted as $B_s$, tells the BRA 5 the amount of bits contributed by the audio encoder 2 for video encoding use.

At the same time, the bit amount used by the previous picture, $B_u$ 7, is provided by the video encoder 10 to the BRA 5. Similarly the fullness of the FIFO buffer 11, $B_f$ 9, is also provided by a fullness detector in FIFO buffer 11. These three parameters, $B_s$, $B_u$ and $B_f$, are then used by the BRA 5 for the calculation of the bits available, $B_a$ 8, for the current picture coding.

According to the value of $B_a$ 8 provided by the BRA 5, the video encoder 10 selects the various picture coding modes to achieve the best possible picture coding quality. The output 12 of the coded picture will be sent to the FIFO buffer 11. The bit usage 7 of the current picture is reported to the BRA 5 for the use of the next picture coding.

The coded audio 3 and video 12 bitstreams are then multiplexed by a system multiplexer 14 where the audio and video synchronization is realized. The system multiplexer 14 multiplexes the audio and video in a constant bit rate and produces a constant system bitstream 15 to either a communication channel or a digital storage media.

Preferred Embodiments

1. Bit rate dynamic control mechanism

A preferred embodiment of the coding system is shown in FIG. 1 where the coding system involves only two picture coding modes. The first picture coding mode is the intrapicture coding that generates I pictures. The second picture coding mode is the predictive coding that generates P pictures. The prediction is only from the previous picture. However, the coding system of this invention is not only limited to I and P picture coding modes. It can also be applied to B picture coding modes.

Figure 2:
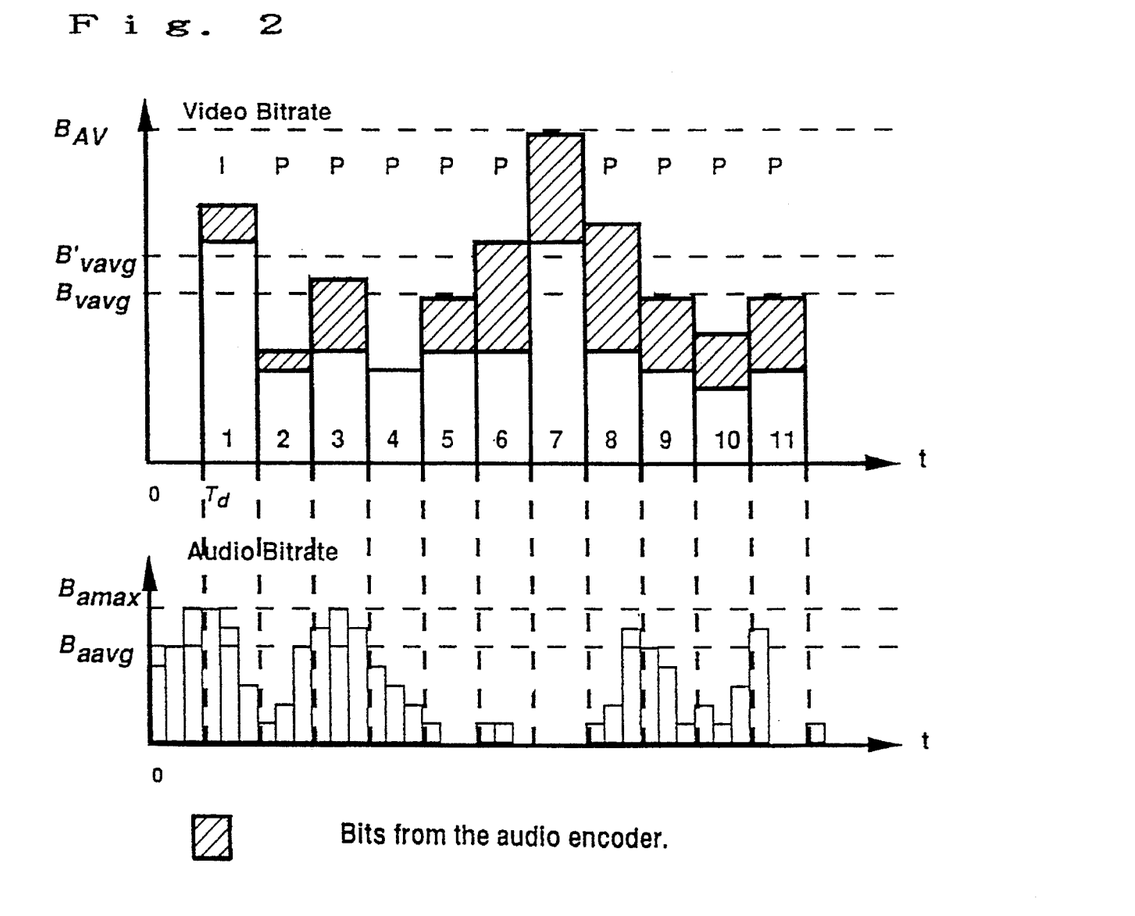
FIG. 2 illustrates the time and bit rate relationship during audio and video encoding process.

The control mechanism of the dynamic bit rate allocation is shown in FIG. 2. Firstly, there is a preset maximum bit rate for audio coding, which is denoted as $B_{amax}$. The audio signal 1 is encoded by using a variable bit rate encoder 2 with the constraint that the coded audio bit rate shall not exceed the $B_{amax}$. Assuming the audio frame rate is set at $F_a$ frames per second and the video picture rate is set at $F_v$ pictures per second. The audio encoder 2 shall start encoding the audio signal 1 for a time period $T_d$. This time is the delay needed by the video encoder 10 and it is set to one picture period. Immediately before starting the encoding of the first picture, the BRA 5 shall send the $B_a$ 8 to the video encoder 10 to specify the available bits for the current picture coding. The video encoder 10 analyzes the value of $B_a$ 8 so as to apply proper picture coding modes.

The effect of applying the above rate control scheme is also shown in FIG. 2. If conventional coding scheme is used, which provides a constant bit rate video bitstream output, the average bit rate would be the amount denoted as $B_{vavg}$. The first I picture uses more bits than the succeeding P pictures (It is usual that the I picture bit rate is twice as high as the P picture bit rate). With the invented coding scheme, the bit saving $B_s$ 4 of the audio frames during the previous picture period is used by the current picture. This results in each picture being able to be encoded with a certain amount of extra bits $B_s$ 4 that are saved by the audio encoder 2. Sometimes, if there is a silent period in an audio signal, the whole bandwidth reserved for audio can then be used by video, as the case of the 8th picture in FIG. 2. These added bits actually help the video encoder to improve the coded picture quality. It is obvious to see from the FIG. 2 that the average video bit rate $B'_{vavg}$ is increased compared to the original video bit rate average $B_{vavg}$. The following formula gives the relation of the average video bit rate and audio bit rate.

$$B'_{vavg} - B_{vavg} = B_{amax} - B_{aavg}$$

Where the $B_{aavg}$ is the average audio bit rate.

Figure 3:
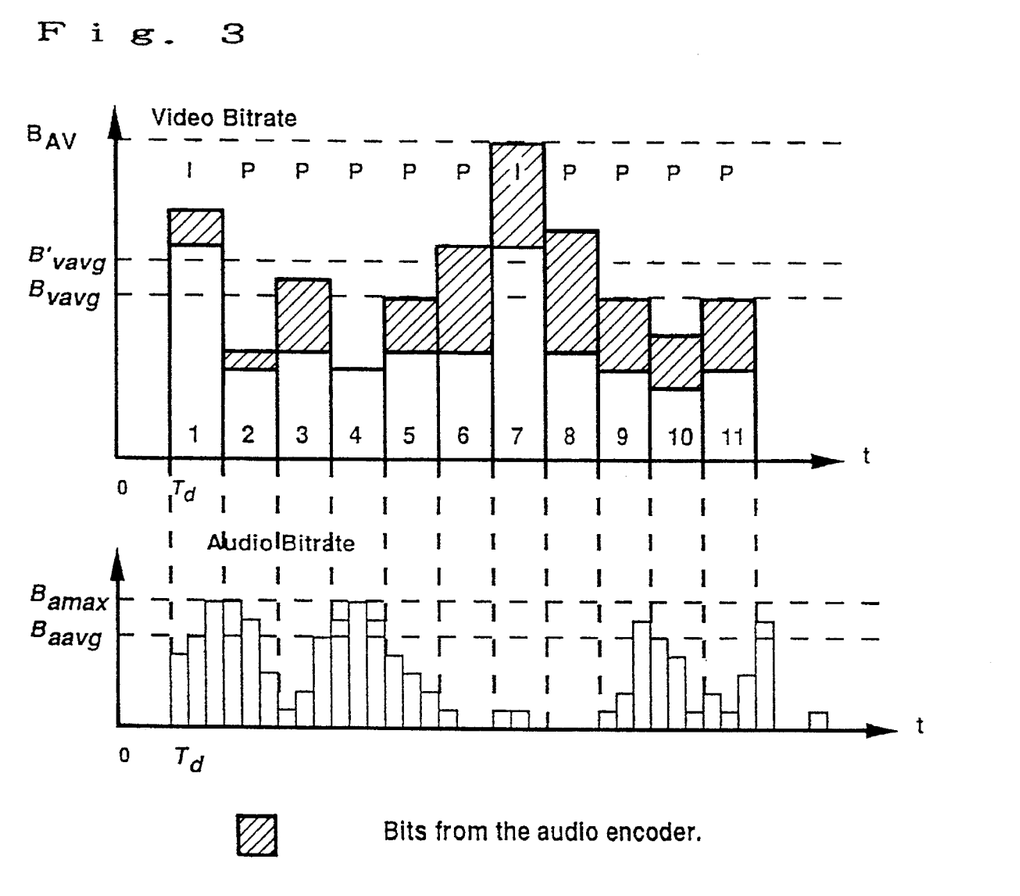
FIG. 3 illustrates the time and bit rate relationship during the multiplexing process.

Because the video encoder 10 starts the encoding process with a delay $T_d$ with respect to the starting time of audio coding and also because the video bit rate is dynamically allocated according to the audio bit saving during the time period of the previous picture, the coded audio bitstream 3 shall be delayed by the same time $T_d$ to match the corresponding video bitstream 12 in both time and bit rate. This operation is illustrated in FIG. 3, where the bit saving in audio and bit spending in video are matched in time. This alignment control is achieved by the system multiplexer 14 that selectively takes audio and video bitstreams from the FIFO buffer 11 and puts in the correct time stamps on the bitstreams for audio and video synchronization.

From both FIG. 2 and FIG. 3, a distinguished feature that is different from the conventional audio and video coding system is that both the audio bitstream 3 and video bitstream 12 are of variable bit rates. However, when the audio bitstream 3 and video bitstream 12 are synchronized by the system multiplexer 14, the output system bitstream 15 is a constant bit rate.

2. Variable bit rate audio encoder

The relationship between the bit saving counter and the variable bit rate audio encoder 2 is depicted in FIG. 4. A bit saving counter (BSC) 25 is introduced. As it is defined above, the audio signal 20 is segmented into $F_a$ frames per second. Assuming the bit spending of the ith audio frame is $f_a(i)$ bits 23, the bit saving during one picture period could be calculated by the following formula:

$$B_s = B_{amax} \cdot N_{af} - \sum_{i=1}^{Naf} f_a(i)$$

Where the $N_{af}$ 28 is the number of audio frames that have been encoded before the $B_s$ request was made from the BRA 5. Once the $B_s$ 29 is sent to the BRA 5, the audio frame counter 27 is reset to zero and continues counting for the next picture period.

Figure 5:
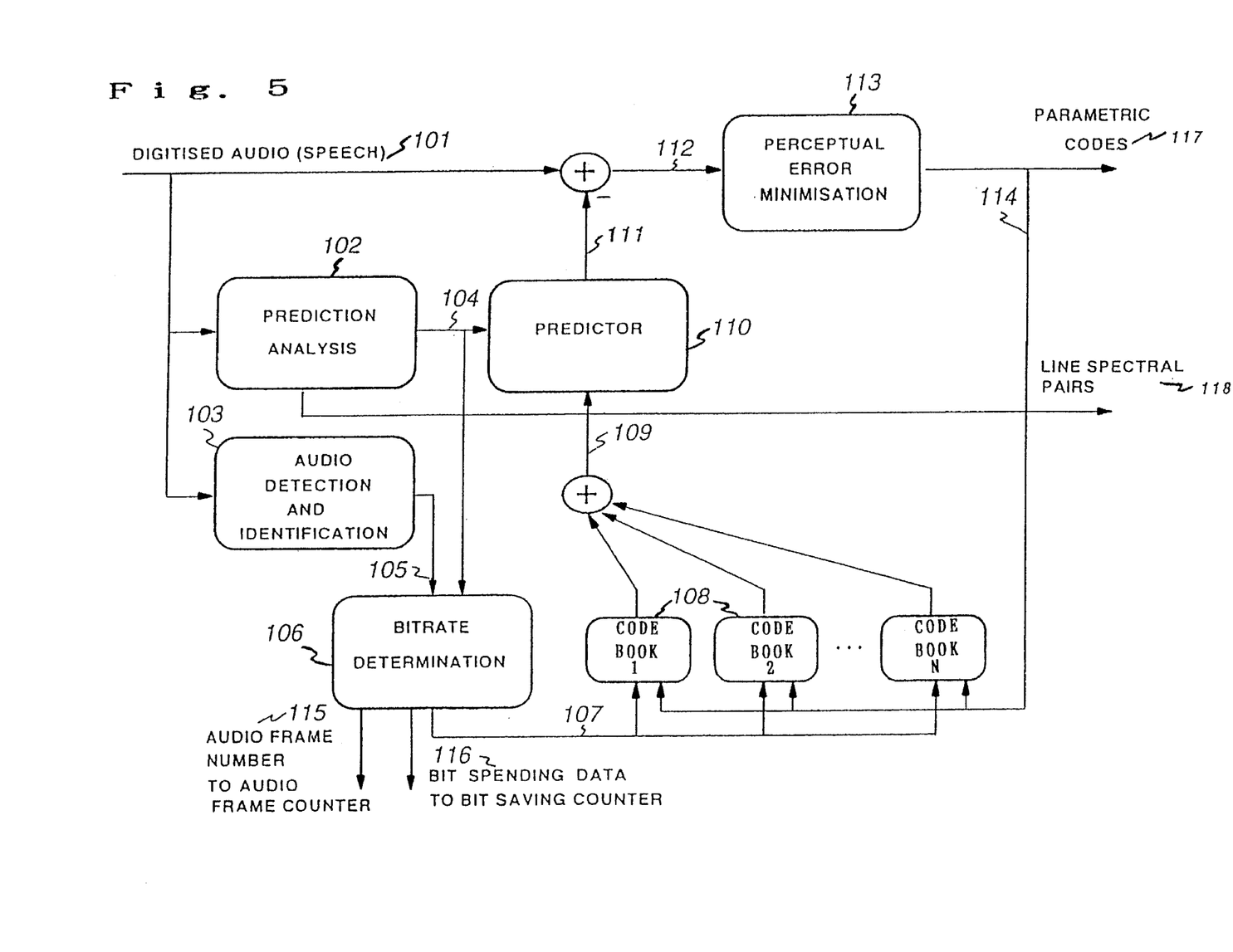
FIG. 5 shows a block diagram of a variable bit rate audio encoder.

As illustrated in FIG. 5, for the purpose of determining the bit spending for each audio frame, the input speech signal 101 is passed to the prediction analysis module 102 and audio detection and identification module 103. The prediction analysis module 102 performs the short-term linear spectrum analysis using a specified Mth order autocorrelation analysis. In the audio detection and identification module 103, the energy distribution across the audio frequency band is computed. Where silence is detected based on a threshold measure, no coding of an audio frame need be done. Together with the resultant prediction coefficients 104 from prediction analysis 102, the characterization of the speech segment into voiced or unvoiced components (or more subclasses) would take place. Depending on the type of application, a maximum bit rate usable for coding of each audio frame could first be present in the bit rate determination module 106. From the prediction coefficient and energy distribution information, a discrete bit rate level equal to or less than the maximum bit rate usable would be selected in the bit rate determination module 106, based on a frequency-weighted Signal-to-Noise measure or other perceptual measure for coding of the audio frame. The bit spending data 116 from each audio frame will be transmitted to the bit saving counter. The audio frame number 115 generated from a cyclic counter would be transmitted to the frame counter. Coding at a lower bit rate than the maximum could be achieved by using proper subsets of the codebooks 108 (or by reduced codebooks or by re-design for the parametric representation). The multiple codebooks 108 constitute the excitation generators which can generate a variety of sequences including pulse-like and noise-like sequences. The summation of the excitation sequences 109 is passed through a predictor which can consist of various predictors 110, e.g. pitch predictor and spectral predictor. The predicted signal 111 is subtracted from the input speech 101 resulting in a difference or error signal 112 which is then perceptually weighted. The perceptually weighted error 114 is then used to drive the error minimization Vector Quantization search procedure. The line spectral pairs 118 and appropriate parametric codes 117 would be transmitted as components of the audio bitstream.

The variable bit rate operation considered thus far has a different approach from the algorithms which have a nominal rate but can operate at bit rates higher and lower than the nominal rate.

3. Bit rate allocator (BRA)

As illustrated in FIG. 1, the BRA 5 receives the audio bit saving $B_s$ 4 from the audio encoder 2, the video bits used by the previous coded picture $B_u$ 7 from the video encoder 10 and the fullness of FIFO buffer $B_f$ 9. Assuming that the preset target bits for picture j is $B_{t(j)}$, which is equal to the preset I picture coding bit rate $B_{tI}$ or the preset P picture coding bit rate $B_{tp}$ for I picture coding and P picture coding respectively, the available bits for the jth picture coding shall be calculated by the following control means.

$$B_{a(j)} = B_{t(j-1)} - B_{u(j-1)} + B_{s(j-1)} + B_{t(j)}$$

$$\text{if } (B_{a(j)} + B_{f(j)} + B_{amax} > B_{fmax}) \{B_{a(j)} < B_{fmax} - B_{f(j)} - B_{amax}\}$$

$$\text{if } (B_{a(j)} + B_{f(j)} + B_{amax} < B_{Av}) \{B_{a(j)} > B_{Av} - B_{f(j)} - B_{amax}\}$$

Where the $B_{fmax}$ is the FIFO buffer size and BAV is the constant system bitstream bit rate. The available bits for the jth picture coding is equal to the difference of the target bits for and the actual bits used by the (j–1)th picture, plus the bit saving of audio encoder 2 during the (j–1) picture coding period, plus the target bits for the jth picture according to the default coding mode. If the sum of the available bits $B_{a(j)}$, the current FIFO buffer fullness $B_{f(j)}$ and the maximal audio bit rate $B_{amax}$ is greater than the maximal FIFO buffer fullness $B_{fmax}$, the available bits for the picture j shall be calculated as the maximum FIFO buffer fullness $B_{fmax}$ minus the current buffer fullness $B_{f(j)}$ and minus the maximal audio bit rate $B_{amax}$ to avoid the FIFO buffer 11 overflow. If the sum of the available bits $B_{a(j)}$, the current FIFO buffer fullness $B_{f(j)}$ and the maximal audio bit rate $B_{fmax}$ is less than the combined audio and video bit rate $B_{AV}$, the available bits for the picture j shall be calculated as the $B_{AV}$ minus the current buffer fullness $B_{f(j)}$ and minus the maximal audio bit rate $B_{amax}$ to avoid the FIFO buffer 11 underflow.

Figure 6:
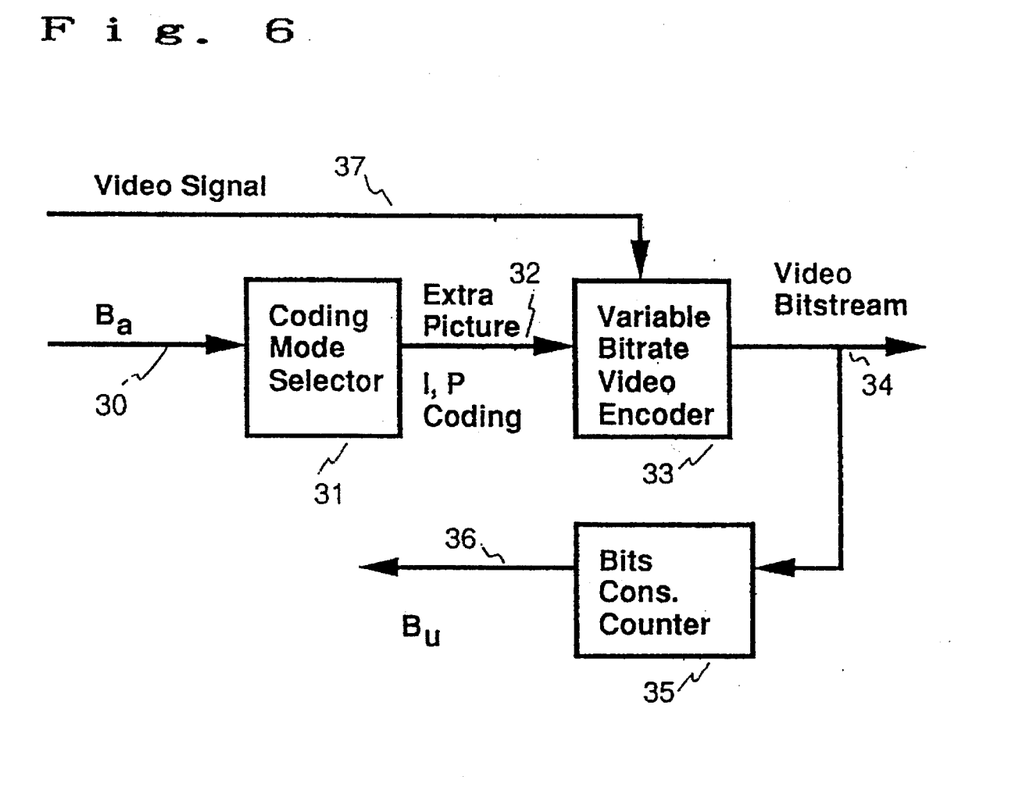
FIG. 6 shows a block diagram of a configuration of a variable bit rate video encoder together with a coding mode selector and a bit consumption counter.

4. Variable bit rate video encoder p The variable bit rate video encoder 10 is configured together with a coding mode selector 31 and a bit consumption counter 35 as illustrated in FIG. 6. The available bits for the current picture $B_a$ 30 is sent to a coding mode selector (CMS) 31. Depending on the value of $B_a$ 30, the CMS 31 conducts a decision making process to select I, P coding or an extra P picture coding. This decision is provided to a variable bit rate video encoder 33 to control the coding of the current picture 37. The encoded video bitstream is outputted through link 34. The output 34 is also sent to the bits consumption counter 35 so that the number of bits used for the current picture coding $B_u$ 36 is calculated and sent to the BRA 5 (FIG. 1) for the next picture coding use.

Figure 7:
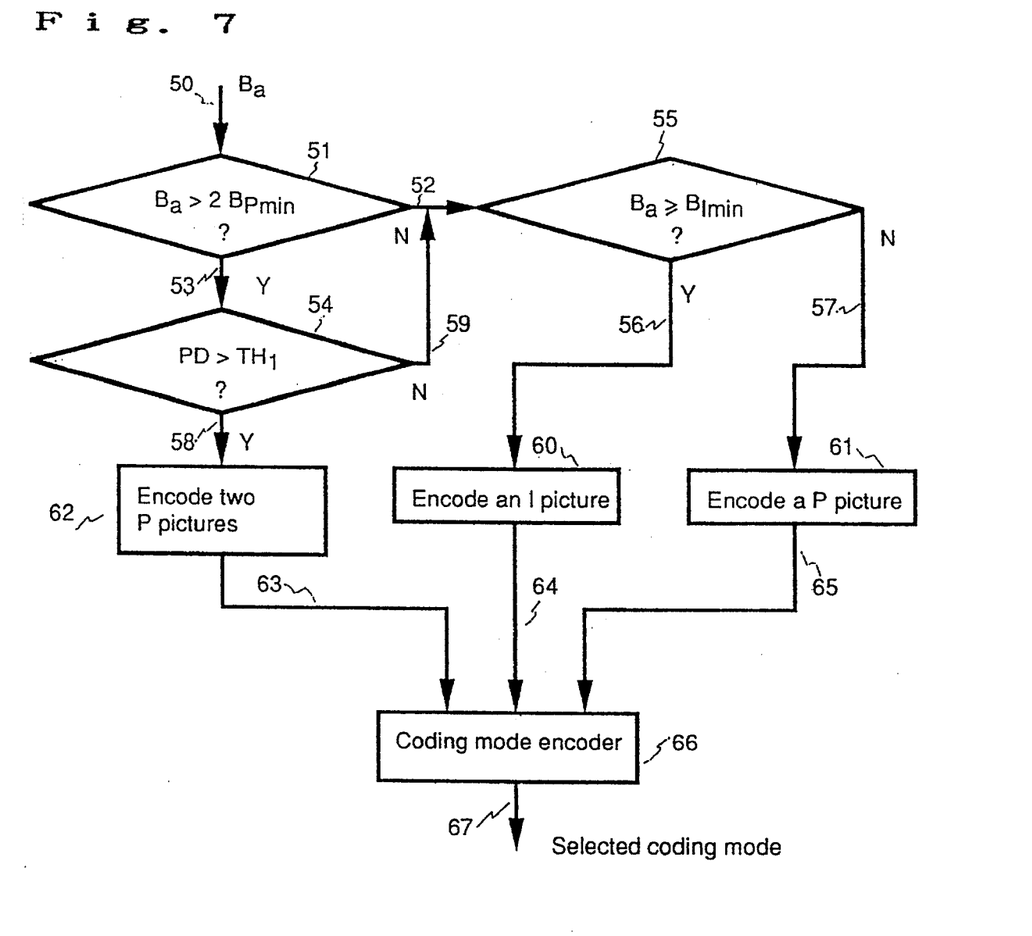
FIG. 7 illustrates the mechanism of dynamic picture coding mode selection flow chart.

The decision making process of CMS 31 is shown in flow chart in FIG. 7. Assume that the minimal bits needed to encode an I picture is $B_{Imin}$ and the minimal bits need to encode a P picture is $B_{Pmin}$. Assume further that there is a present threshold $TH_1$ to check the picture difference (PD) between the previous encoded picture and the picture that is located in the middle of the previous encoded picture and the current picture to be encoded.

The available bits for the current picture $B_a$ 50 is inputted to the comparator 51. If the $B_a$ is greater than two times $B_{Pmin}$, it implies that the available bits are enough to encode two P pictures. In other words, an extra P picture could be inserted. In this case, the output of the comparator 51 goes through the link 53 to the comparator 54, which is used to check further whether it is necessary to insert a P picture based on the PD value as defined previously. If the PD value is greater than the preset threshold $TH_1$, it implies that there is substantial changes of picture contents from the previous encoded picture to the picture in the middle of the previous encoded picture and the current picture to be encoded. Therefore, the decision 62 is made to encode two P pictures if the output of the comparator 54 is "Yes" through the link 58.

However, if the comparator 54 outputs a "No" through link 59, it implies that the middle picture has no substantial changes with respect to the previous encoded picture and there is no need to insert an extra P picture. The available bit amount $B_a$ is then check through link 59 by the comparator 55 for the decision making of either an I picture coding or a P picture coding. This process also applies to the case when the comparator 51 outputs "No" from the link 52. Therefore, the succeeding decision making procedure applies to both cases of link 52 and link 59.

In the comparator 55, the available bit amount $B_a$ is compared with the minimal I picture coding bit amount, $B_{Imin}$.

If $B_a 24 B_{Imin}$, it implies that the available bits are enough to encode an I picture and the decision 60, I picture coding, is activated by the output from the link 56. If $B_a < B_{Imin}$, the decision 61, P picture coding, is selected by the output from the link 57.

Only one of the decisions of 60, 61, and 62 is selected at one time and sent through one of the links of 63, 64, and 65 to the coding mode encoder 66, which converts the selected decision into an unique coding mode code to the output link 67.

The mechanism described above is defined as the dynamic I and P picture coding mode control.

When a picture coding mode is determined, the $B_a$ is used to adjust the quantization step so as to dynamically control the bit rate generated from the current picture coding. This mechanism is defined as dynamic quantization step control.

Figure 8:
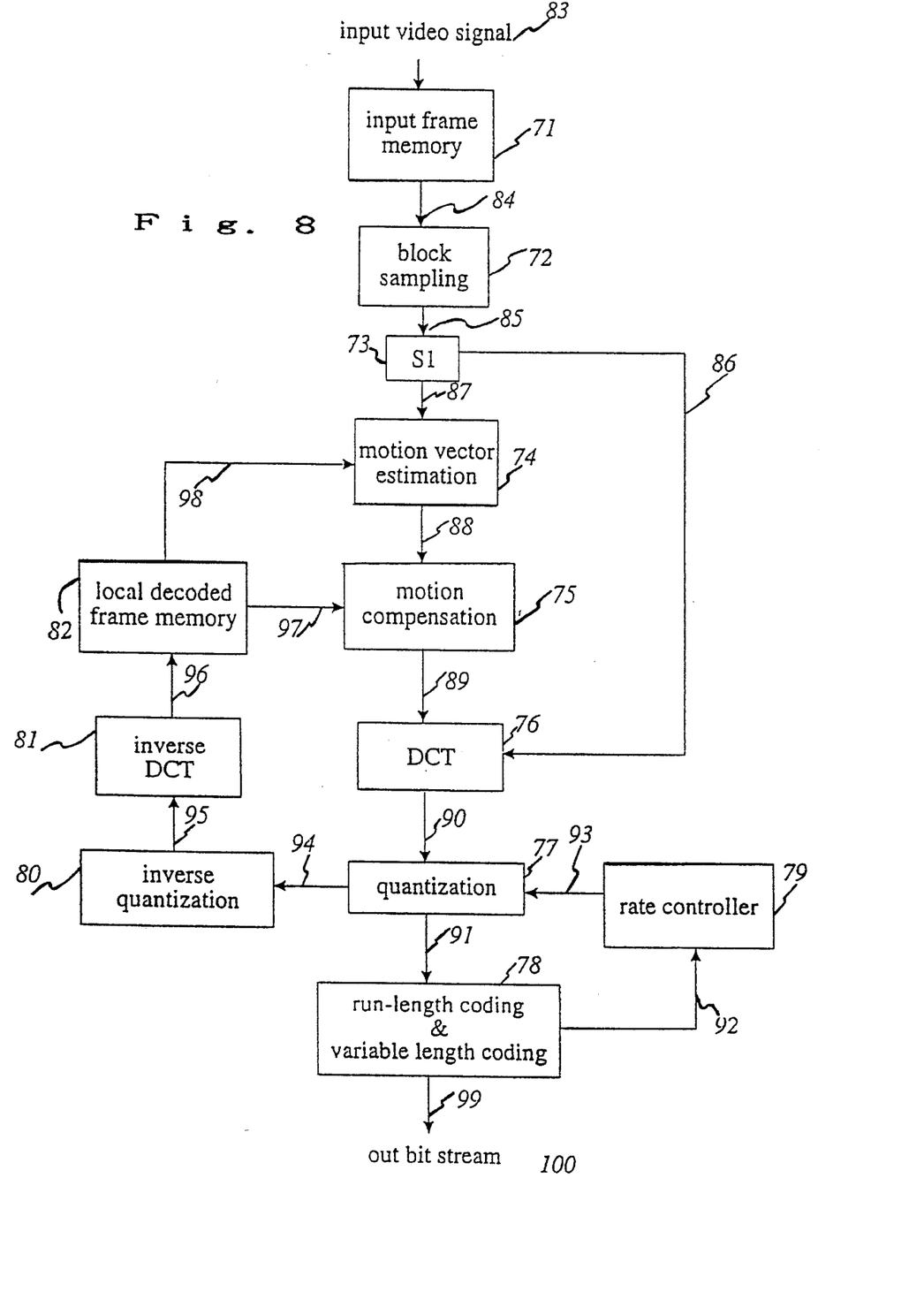
FIG. 8 shows a block diagram of a video transform coding scheme.

A variable bit rate video encoder 33 is then used to code the current picture according to the picture coding mode 32 selected by the CMS 31. One preferred embodiment of the video encoder 33 is shown in FIG. 8, which is a transform coding system.

An input video signal containing pixel data of each picture is inputted and stored in an input picture memory 71. A block sampling circuit 72 receives the data stored in the input picture memory 71 through a line 84 and partitions the picture data into spatially non-overlapping blocks of pixel data. To provide a reasonable level of adaptiveness, a block size of 8×8 pixels may be used. The picture number of the picture is also stored in the input picture memory 71 and passed through the block sampling circuit 72 to a switch (SI) 73. Based on the picture number, the switch 73 selectively delivers the output blocks of pixel data from the block sampling circuit 72 through a line 86 for coding in the intra-coded mode or to a line 87 for coding in the predictive-coded mode.

For the intra-coded mode, the output of the block sampling circuit 72 is passed through line 86 to a discrete cosine transform (DCT) circuit 76. The DCT circuit 76 performs a discrete cosine transform, which is a popular mathematical transformation for converting image data to data in the frequency domain. The transformed data, i.e., DCT coefficients, are then subjected to the process of quantization in a quantization circuit 77 using a quantizer matrix and a quantization step size which is given by a rate controller 79 through line 93. The quantized data is passed together with the quantizer step as side information, through line 91 to run-length coding and variable length coding circuit 78 which performs run-length coding of the quantized data and the associated side information followed by variable length coding of the run-length coded result. The output of the run-length coding & variable length coding circuit 78 is a coded bit stream 100 ready to be transmitted to the decoder. This bit stream is also passed through line 92 to rate controller 79. Based on the number of bits already used at the time of encoding the block, the rate controller 79 adjusts the quantizer step so that the output bit stream satisfies the bit rate requirement of the encoder system. The quantized values obtained by the quantization circuit 77 are passed also through a line 94 to an inverse quantization circuit 80 and an inverse discrete cosine transform (inverse DCT) circuit 81. The inverse quantization circuit 80 and inverse DCT circuit 81 perform the reverse process performed by the DCT circuit 76 and quantization circuit 77 to obtain reconstructed data. The reconstructed data is stored in a local decoded picture memory 82 through line 96, and will be used for motion estimation and compensation process for the next input picture, which will be a predictive-coded picture. After the whole of the I-picture has been coded, the rate controller will calculate the total bit used for coding the I-picture, and decide the number of bits to be allocated to the next P and B-picture.

For the predictive-coded mode, the output of the block sampling 72 is passed through switch S1 and then a line 87 to a motion vector (MV) estimation circuit 74. In MV estimation circuit 74, motion vector estimation is performed to determined the MV from the adjacent picture using the local decoded picture from the local decoder picture memory 82, obtained through line 98. The MV estimation circuit 74 finds the closest match by, for example, determining the direction of translatory motion of the blocks of pixels from one picture to the next by finding the best matching block based on some predetermined criteria, such as mean square error.

The MV obtained in the motion vector estimation process are passed, together with the blocks to be coded, through line 88 to a motion compensation circuit 75 which performs motion compensation using the blocks stored in the local decoded picture memory 82 as predicted blocks. The predicted block is obtained from the local decoded memory using the offset given by the MV. Differences between values of the pixels of the block to be coded and values of the pixels of the predicted block are computed to obtain a differential block composed of the difference values. Based on the differential block, the motion compensation circuit 75 also determines whether the block to be passed to DCT circuit 76 for transformation (block to be transformed) should be motion compensated or not by comparing the activity of the block to coded and the differential block using some predefined criteria, such as standard deviation of the blocks. If the block to be transformed is decided to be motion compensated, its differential block is passed through line 89 to DCT circuit 76. If the block to be transformed is decided not to be motion compensated, the block itself (i.e. the original block outputted from the block sampling circuit 72) is passed through the line 89 to the DCT circuit 76 (which is the same as the block of the intra-coded picture). Further, the motion compensation circuit 75 produces an information bit indicating whether a block is coded with motion compensation or not and passes the information bit together with the motion vector to the DCT circuit 76. That is, the data outputted from the motion compensation circuit 75 through the line 89 to be the DCT circuit 76 are either the differential block (coded with motion compensation) or the original block (coded without motion compensation), the information bit indicating whether or not the block is coded with motion compensation, and also the motion vector in the case of a differential block.

The block data from the motion compensation circuit 75 is transformed to DCT coefficients in the DCT circuit 76, and the DCT coefficients are quantized in the quantization circuit 77 to be quantized DCT coefficients. The information bits each indicate whether or not a block is coded with motion compensation and the motion vector are passed through the DCT circuit 76 and the quantization circuit 77 through a line 90. The quantized data (quantized DCT coefficients), together with side information including the quantization step, the motion vectors and the information bits each indicating whether or not motion compensation is done to a block are passed through the line 91 to the run-length coding and variable length coding circuit 78 to be subjected to run-length coding and variable length coding to decode the output coded bit stream. The bit stream is also passed through the line 92 to the rate controller 79. The quantized data from the quantization circuit 77 is also passed through the line 94 to be subjected to inverse quantization in the inverse quantization circuit 80, inverse DCT in the inverse DCT circuit 81 and stored in the local decoded picture memory 82 for the encoding of the next picture.

5. FIFO buffer

Figure 9:
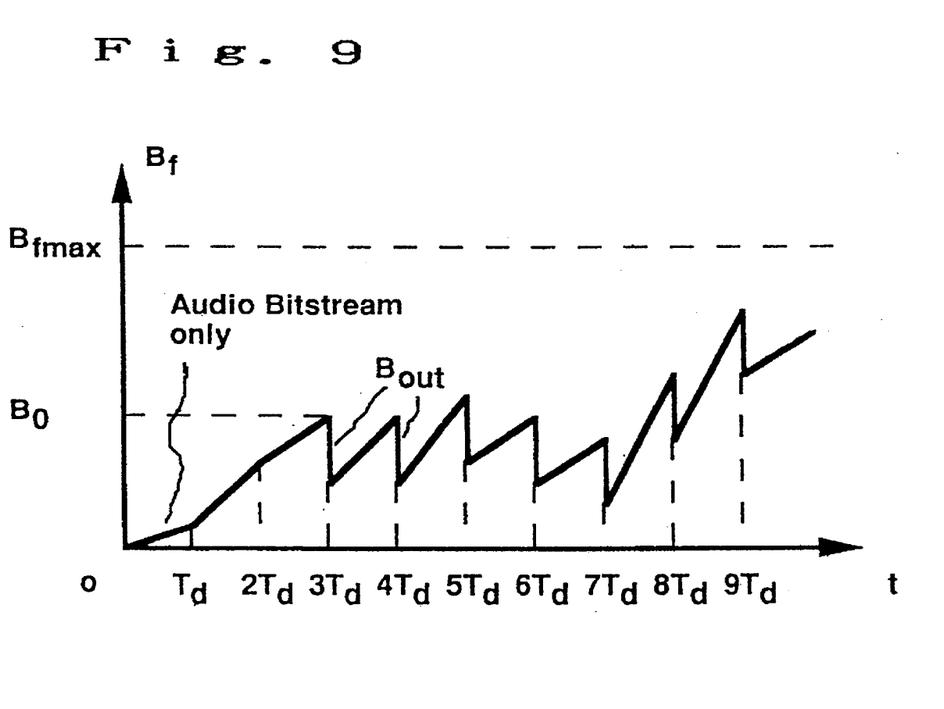
FIG. 9 illustrates the FIFO buffer fullness.

FIG. 9 shows an example of the FIFO buffer status during the encoding process of audio and video. For the first time period $T_d$, the coded audio bitstream 3 is written to the FIFO buffer 11. Starting from the moment $T_d$, the FIFO buffer 11 is filled by both audio bitstream 3 and the video bitstream 12. When the FIFO buffer 11 is filled up to a preset fullness $B_O$, the system multiplexer 14 starts to collect bits from the FIFO buffer 11. Since the system multiplexer 14 takes bits from the FIFO buffer 11 in a constant bit rate $B_{AV}$, the buffer fullness is reduced at a fixed amount, denoted as $B_{out}$. This value remains constant. Because the audio and video bit rate are variable, the combination of them is also a variable bit rate. Therefore, the speed of FIFO buffer 11 is changing from one time period to another, as illustrated in FIG. 9 by different gradients of the buffer fullness curve in each time period. The $B_O$ is set to avoid the FIFO buffer 11 overflow or underflow. However, this also introduces a time delay for the bitstreams to be transmitted, as illustrated in FIG. 9 by $3T_d$.

6. System Multiplexer

The system multiplexer multiplexes the input video and audio data from the FIFO buffer by putting the input video and audio data into packets of fixed length, and inserting the time stamp into the corresponding audio frames and video picture to ensure the correct synchronization. Two time stamps are used: presentation time stamp (PTS), which indicates when the presentation unit of an audio or video picture should be played or broadcast, and decoding time stamp (DTS) which indicates the time to decode an audio or video picture. The PTS and DTS have a common time base, called system clock reference (SCR), to unify the measurement of the timing, ensure correct synchronization, and buffer management.

For audio data, the system multiplexer keeps track of the number of pictures sent and as new data is obtained from the FIFO, an appropriate PTS will be inserted in to the packet header. No DTS is necessary as the presentation time has a fixed relationship with the decoding time.

For video data, the system multiplexer also keeps track of the number of pictures sent and appropriate PTS and DTS are inserted to the packet header. DTS is necessary in the case when the decoding time and the presentation time of the picture are different.

7. Effects of the Invention

The present invention has made a significant improvement over the prior art method.

The invention is a constant bit rate video and associated audio coding system which has various dynamic control mechanisms that would allow for savings in the audio encoder to be used by the video encoder.

The invention provides the mechanisms to control the picture rate as well as picture coding modes. This results in more efficient use of bits available over a fixed period of time, thereby improving the quality of video signal significantly without compromising the audio quality.

The invention is especially effective for very low bit rate video and associated audio coding. For an instance, when this invention is applied to the videophone application, it can improve the picture quality by making use of all of the audio bit rate of the listener so that the pictures are encoded in more bits and transmitted to the person who is speaking.

What is claimed is:

1. A dynamic bit rate controlled video and associated audio coding system that makes use of bit saving by audio coding to increase video coding bit rate so as to improve picture coding quality, said system comprising:

a bit rate allocator (BRA);

a variable bit rate audio encoder for encoding an audio input signal and providing bit saving for video encoder use, the variable bit rate audio encoder including means for audio detection and identification (ADI), audio prediction analysis means, the ADI and the audio prediction analysis means determining whether an audio frame may be skipped, and an appropriate bit rate to be used for coding of an audio frame, and means for computation of a total audio bit rate saving $B_s$) during a previous picture coding period, the bit rate saving computation means supplying and sending B, to the BRA, the ADI analyzing frequency and energy content of the input audio signal to determine the energy level and the energy distribution thereof, classifying audio signal type based upon the energy level and energy distribution as silence or predominantly unvoiced and voiced signals, and estimating tolerable coding inaccuracy and quantization noise for generating a bit rate for audio coding;

a variable bit rate video encoder for encoding an input video sequence in a picture rate in a certain number of pictures per second, the variable bit rate video encoder including means for dynamically controlling the picture rate according to available bits for current picture coding, means for dynamically controlling picture coding modes, and means for dynamically allocating bits to a relatively small Dart of a picture according to picture activity of the small part;

a FIFO buffer;

the bit rate allocator dynamically allocating the amount of bits available for a current picture to be coded, the BRA including means for calculating an available bit amount for current picture coding according to the $B_s$, previous picture bit usage ($B_u$), and FIFO buffer fullness ($B_f$), the value of $B_s$ and $B_f$ being sent to the BRA when a request signal is made to the audio encoder and the FIFO buffer;

the FIFO buffer buffering both the coded audio and video bitstreams and providing a constant bit rate bitstream for combined video and associated audio; and a multiplexer for multiplexing the audio and video bitstreams with added time stamps for synchronizing of an output audio and video signal.

2. A variable bit rate video encoder according to claim 1, wherein the means for dynamically controlling picture coding modes includes:

decision means for dynamically controlling I picture coding and P picture coding according to an available bit amount $B_a$ and a minimal I picture coding bit rate $B_{Imin}$ and a minimal P picture coding bit rate $B_{Pmin}$.

3. A variable bit rate video encoder according to claim 1, wherein the dynamic picture rate control includes:

decision means for inserting an extra P picture in between the previous coded picture and the current picture according to an available bit amount $B_a$, a present minimal bit amount for a P picture coding, and picture content changes of the picture to be inserted with respect to the previous coded picture.

4. A coding system according to claim 1, wherein the FIFO buffer includes:

means for calculating the buffer fullness ($B_f$) and reporting $B_f$ to the BRA when a request signal from the BRA is received by the FIFO buffer.

5. A coding system according to claim 1, wherein the multiplexer includes:

means for retrieving audio and video bitstreams and multiplexing them into a mixed and synchronized bitstream; and means for generating a constant bit rate multiplexed bitstream output by matching the audio and video bitstreams with respect to their time and bit rate relationship.

* * * * *